United States Patent
Shatsky et al.

(10) Patent No.: US 12,235,811 B2
(45) Date of Patent: Feb. 25, 2025

(54) DATA DEDUPLICATION IN A DISAGGREGATED STORAGE SYSTEM

(71) Applicant: EMC IP Holding Company LLC, Hopkinton, MA (US)

(72) Inventors: Yosef Shatsky, Karnei Shomron (IL); Doron Tal, Geva Carmel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 415 days.

(21) Appl. No.: 17/351,733

(22) Filed: Jun. 18, 2021

(65) Prior Publication Data
US 2022/0405254 A1   Dec. 22, 2022

(51) Int. Cl.
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
None
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,560,503 B1 * | 10/2013 | McManis | G06F 16/00 707/812 |

(Continued)

FOREIGN PATENT DOCUMENTS

WO PCT/US2019/024885   1/2020
WO PCT/US2019/024900   1/2020

(Continued)

OTHER PUBLICATIONS

Dell EMC, "Dell EMC VxRack FLEX," Dell EMC Product Overview, 2018, 5 pages.

(Continued)

*Primary Examiner* — Polina G Peach
*Assistant Examiner* — Anugeetha Kunjithapatham
(74) *Attorney, Agent, or Firm* — Ryan, Mason & Lewis, LLP

(57) ABSTRACT

A data deduplication process is performed in a storage system which includes storage nodes, and storage control nodes which can access data directly from each storage node. A first storage control node sends a message to a second storage control node to initiate a deduplication process with respect to a given data block and an original data block owned by the second storage control node. The second storage control node increments a reference counter associated with the original data block, and sends a message to the first storage control which includes metadata. The first storage control node uses the metadata to read the original data block from a given storage node, performs a data compare process to determine whether the given data block matches the original data block, and creates a reference to the original data block, if the given data block matches the original data block.

20 Claims, 4 Drawing Sheets

(56) References Cited

U.S. PATENT DOCUMENTS

| | | | |
|---|---|---|---|
| 8,843,676 | B2 | 9/2014 | Rajamanickam et al. |
| 9,141,554 | B1* | 9/2015 | Candelaria .......... H03M 7/3091 |
| 9,152,335 | B2* | 10/2015 | Sundaram ............ G06F 3/0643 |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,809,928 | B2* | 10/2020 | Battaje .................... G06F 3/067 |
| 11,537,573 | B2* | 12/2022 | Ghanbari ............ G06F 16/1748 |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2011/0029497 | A1* | 2/2011 | Benhase ............... G06F 3/0608 |
| | | | 707/698 |
| 2013/0054906 | A1* | 2/2013 | Anglin .................. G06F 3/0641 |
| | | | 711/159 |
| 2013/0305002 | A1 | 11/2013 | Hallak et al. |
| 2014/0089275 | A1* | 3/2014 | Akirav .................. G06F 3/0652 |
| | | | 707/692 |
| 2014/0244935 | A1 | 8/2014 | Ezra et al. |
| 2014/0304464 | A1* | 10/2014 | Bert ....................... G06F 3/0688 |
| | | | 711/105 |
| 2016/0103764 | A1 | 4/2016 | Banerjee et al. |
| 2018/0060367 | A1* | 3/2018 | Ioannou ................ G06F 16/215 |
| 2018/0113640 | A1 | 4/2018 | Fernandez et al. |
| 2018/0267893 | A1 | 9/2018 | Barzik et al. |
| 2018/0292995 | A1* | 10/2018 | Tal ........................ G06F 3/0641 |
| 2018/0300075 | A1 | 10/2018 | Fernandez et al. |
| 2018/0349053 | A1* | 12/2018 | Battaje ................ G06F 12/0891 |
| 2019/0227845 | A1 | 7/2019 | Sridhar et al. |
| 2022/0237205 | A1* | 7/2022 | Kamran ................ G06F 21/602 |

FOREIGN PATENT DOCUMENTS

| | | |
|---|---|---|
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReVivel/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

U.S. Appl. No. 16/830,469 filed in the name of Roi Tagar et al. on Mar. 26, 2020, and entitled "Storage Block Balancing Using Volume Part Migration."

U.S. Appl. No. 16/830,473 filed in the name of Yugal Peleg Lieblich et al. on Mar. 26, 2020, and entitled "Replicated State Cluster with Standby Node State Assessment During Leadership Transition."

U.S. Appl. No. 16/830,946 filed in the name of Gil Ben Zeev et al. on Mar. 26, 2020, and entitled "Storage Volume Migration Scheduling Based on Storage Volume Priorities and Specified Constraints."

U.S. Appl. No. 16/832,763 filed in the name of Michal Yarimi et al. on Mar. 27, 2020, and entitled "Managing Storage Device Errors During Processing of Inflight Input/Output Requests."

U.S. Appl. No. 16/834,363 filed in the name of Itay Keller et al. on Mar. 30, 2020, and entitled "Managing Least Recently Used Cache Using Reduced Memory Footprint Sequence Container."

U.S. Appl. No. 16/836,824 filed in the name of Itay Keller et al. on Mar. 31, 2020, and entitled "Management of Volume Snapshots in a Data Storage System."

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. on Jul. 1, 2020, and entitled "Sharing Memory Resources Between Asynchronous Replication Workloads."

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. on Sep. 18, 2020, and entitled "Automatic Discovery and Configuration of Server Nodes."

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/070,288 filed in the name of Anurag Sharma et al. on Oct. 14, 2020, and entitled "Pipeline-Based System for Configuration Checking and Reporting Associated with an Information Processing System."

U.S. Appl. No. 17/071,407 filed in the name of John Moran et al. on Oct. 15, 2020, and entitled "Dynamic Remediation Actions in Response to Configuration Checks in an Information Processing System."

U.S. Appl. No. 17/077,105 filed in the name of Yosef Shatsky et al. on Oct. 22, 2020, and entitled "Volume Tiering in Storage Systems."

U.S. Appl. No. 17/106,988 filed in the name of Rivka Matosevich et al. on Nov. 30, 2020, and entitled "Managing Host Connectivity to a Data Storage System."

(56) References Cited

OTHER PUBLICATIONS

U.S. Appl. No. 17/123,525 filed in the name of Itay Keller et al. on Dec. 16, 2020, and entitled "Deferred Reclamation of Invalidated Entries Associated with Replication in a Log-Structured Array."
U.S. Appl. No. 17/145,646 filed in the name of Yosef Shatsky et al. on Jan. 11, 2021, and entitled "Redistribution of Processing Groups between Server Nodes Based on Hardware Resource Utilization."
U.S. Appl. No. 17/232,203 filed in the name of Roman Spiegelman on Apr. 16, 2021, and entitled "Object Synchronization of Server Nodes in a Network Computing Environment."
U.S. Appl. No. 17/236,256 filed in the name of Doron Tal et al. on Apr. 21, 2021, and entitled "Recovery from Partial Device Error in Data Storage System."
U.S. Appl. No. 17/306,601 filed in the name of Rivka Matosevich et al. on May 3, 2021, and entitled "Managing Replication Journal in a Distributed Replication System."
U.S. Appl. No. 17/308,166 filed in the name of Adi Bar Shalom et al. on May 5, 2021, and entitled "Journal Barrier Consistency Determination."

\* cited by examiner

DATA DEDUPLICATION IN A DISAGGREGATED STORAGE SYSTEM

TECHNICAL FIELD

This disclosure relates generally to data storage management techniques and, more particularly, to data deduplication techniques in a storage system.

BACKGROUND

Data deduplication is a common method that is implemented to reduce the amount of data in a storage system. In general, data deduplication involves discovering and removing duplicate data, wherein a deduplication operation takes place when the same block of data or file is written to multiple locations of the storage system. Such locations may be cross-volume and/or cross-node depending on the implementation. The process of removing duplicate data generally includes replacing the duplicate data with a reference (e.g., pointer) to a single instance of the data, thereby reducing the amount of stored data. There are various types of data deduplication techniques which identify and eliminate redundant data using different algorithms, all of which require some level of overhead to discover and remove the duplicate data, which can impact storage system performance. In this regard, data deduplication should be implemented in a way that minimizes such overhead to thereby minimize the impact on storage system performance.

SUMMARY

Exemplary embodiments of the disclosure include techniques for implementing data deduplication in a storage system. For example, an exemplary embodiment includes a data deduplication process that is performed in a data storage system. The data storage system comprises storage nodes, and storage control nodes comprising at least a first storage control node and a second storage control node. Each of the storage control nodes can access data directly from each of the storage nodes. The first storage control node sends a first message to the second storage control node, wherein the first message comprises a request to initiate a deduplication process with respect to a given data block obtained by the first storage control node and an original data block owned by the second storage control node. The second storage control node increments a reference counter associated with the original data block, and sends a second message to the first storage control node, wherein the second message comprises metadata which comprises information to enable the first storage control node to read the original data block from a given storage node. The first storage control node reads the original data block from the given storage node based on the metadata of the second message. The first storage control node performs a data compare process to determine whether the given data block matches the original data block, and creates a reference to the original data block, in response to determining that the given data block matches the original data block.

Other embodiments of the disclosure include, without limitation, systems and articles of manufacture comprising processor-readable storage media, which are configured to implement data deduplication in a storage system.

DETAILED DESCRIPTION

Exemplary embodiments of the disclosure will now be discussed in further detail with regard to systems and methods for performing data deduplication in a storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
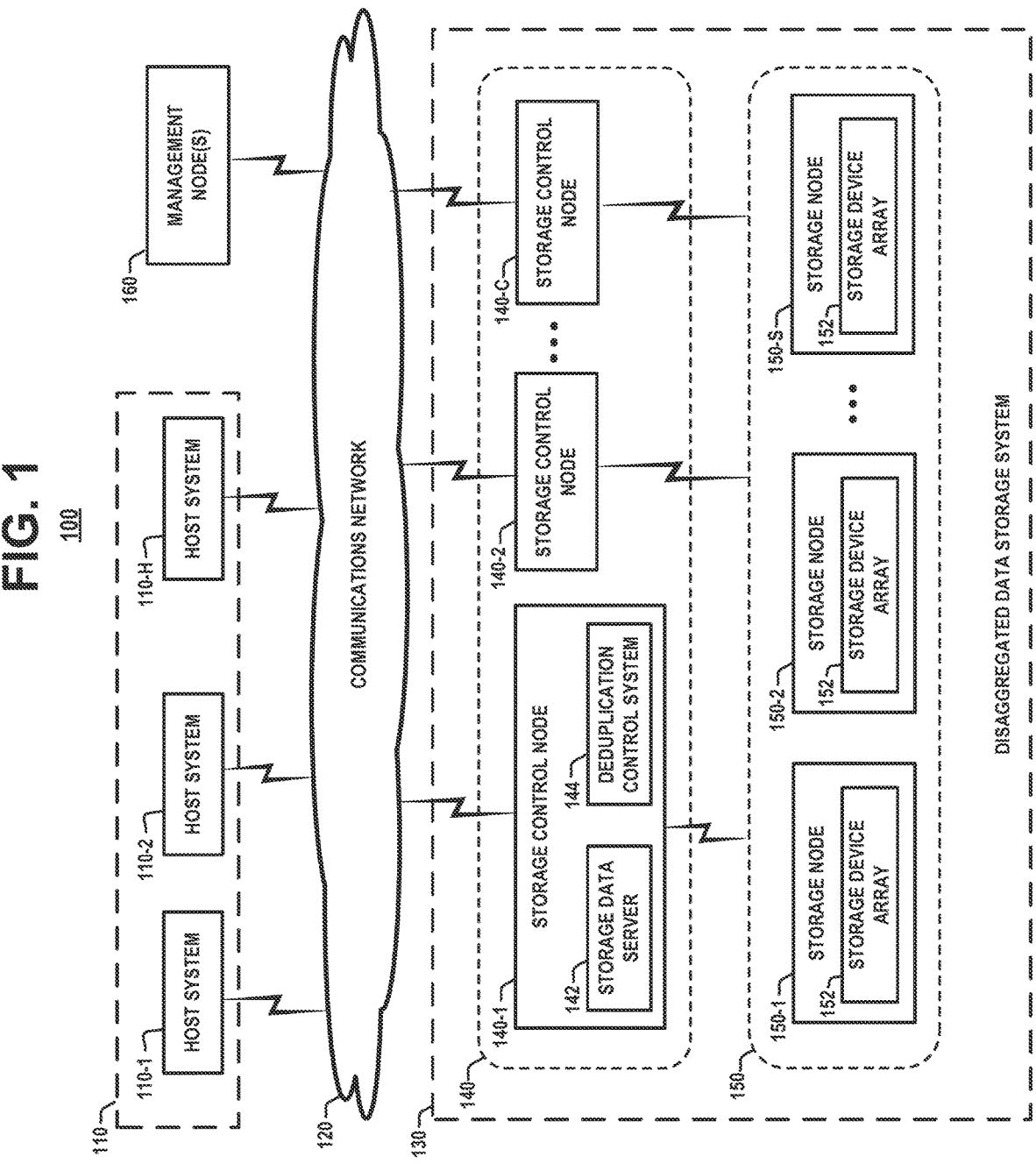
FIG. 1 schematically illustrates a network computing system comprising a storage system which implements a data deduplication system, according to an exemplary embodiment of the disclosure.

FIG. 1 schematically illustrates a network computing system comprising a storage system which implements a data deduplication system, according to an exemplary embodiment of the disclosure. In particular, FIG. 1 schematically illustrates a network computing system 100 which comprises one or more host systems 110-1, 110-2, . . . 110-H (collectively, host systems 110), a communications network 120, and a data storage system 130. The data storage system 130 comprises a plurality of storage control nodes 140-1, 140-2, . . . , 140-C (collectively, storage control nodes 140), and a plurality of storage nodes 150-1, 150-2, . . . , 150-S (collectively, storage nodes 150). As shown in FIG. 1, the storage control node 140-1 comprises a storage data server 142, and a data deduplication control system 144. Further, in an exemplary embodiment, the other storage control nodes 140-2 . . . 140-C have the same or similar configuration as the storage control node 140-1 shown in FIG. 1. Each storage node 150-1, 150-2, . . . , 150-S comprises a storage device array 152, wherein each storage device array 152 comprises an array of storage devices (homogenous array or heterogenous array of storage devices).

The network computing system 100 further comprises one or more management nodes 160. In general, the management nodes 160 implement application programming interfaces (APIs) to enable manual, automated, and/or semi-automated configuration, management, provisioning, and monitoring of the data storage system 130 and the associated storage control nodes 140 and storage nodes 150. In some embodiments, the management nodes 160 comprise standalone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 150 and (ii) read requests to access data that is stored in one or more of the storage nodes 150. The storage control nodes 140 are configured to receive and process the data access requests and to store/read data to/from the target storage nodes 150.

The communications network 120 is configured to enable communication between the host systems 110 and the data storage system 130, and between the management nodes 160, and the host systems 110 and the data storage system 130, as well as to enable peer-to-peer communication between the storage control nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Internet Protocol (IP)-based or Fibre Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. The storage control nodes 140 and the storage nodes 150 can be physical nodes, virtual nodes, and a combination of physical and virtual nodes.

For example, in some embodiments, each storage control node 140 comprises a server node that is implemented on, e.g., a physical server machine or storage appliance comprising hardware processors, system memory, and other hardware resources that execute software and firmware to implement the various storage control functions and data management functions as discussed herein. More specifically, in some embodiments, each storage control node 140 comprises a plurality of storage control processors which execute a lightweight operating system (e.g., a customized lightweight Linux kernel) and functional software (e.g., software-defined storage software) to implement various functions of the storage control node 140 which include, but are not limited to, (i) managing and executing data access requests issued by the host systems 110 for storing/reading data to/from the storage nodes 150, (ii) performing various data management and storage services, and (iii) controlling network communication and connectivity with the host systems 110 and between the storage control nodes 140 within the data storage system 130, etc.

In a distributed storage environment, the storage control nodes 140 are configured to communicate in a cooperative manner to perform functions such as e.g., processing data access requests received from the host systems 110, aggregating/pooling the storage capacity of storage device arrays 152 of the storage nodes 150, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage device arrays 152 of the storage nodes 150 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, one or more of the storage device arrays 152 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in each storage node 150. In this regard, the term "storage device" as used herein should be broadly construed to encompass all types of persistent storage media including hybrid drives.

In some embodiments, the data storage system 130 comprises a disaggregated data storage system in which data processing is separate from data storage. More specifically, the storage control nodes 140 comprise storage controller nodes which are configured to handle the processing of data associated with data access requests (i.e., input/output (I/O) read and write requests), and the storage nodes 150 are configured to handle writing/reading data to/from the respective storage device arrays 152. As noted above, the storage control nodes 140 and the storage nodes 150 can be physical nodes, virtual nodes, and a combination of physical and virtual nodes. The disaggregated data storage system 130 is configured to allow each storage control node 140-1, 140-2, . . . , 140-C to directly access data stored on any one of the storage nodes 150-1, 150-2, . . . , 150-S. The disaggregated storage system architecture essentially separates the storage control compute layers (e.g., storage control nodes 140) from the data storage layers (e.g., data storage nodes 150) which are managed within the same fabric. In some embodiments, the disaggregated data storage system 130 comprises a scale-out storage system in which the arrays of storage devices 152 can be configured to include logical pools of storage which can be accessed by the storage control nodes 140.

The data storage system 130 can be configured using known techniques to implement a disaggregated data storage system. For example, in some embodiments, the storage nodes 150-1, 150-2, . . . , 150-S can be external direct-attached storage (DAS) devices, wherein each storage node 150-1, 150-2, . . . , 150-S is connected to each storage control node 140-1, 140-2, . . . , 140-C using any suitable interface protocol such as Small Computer Systems Interface (SCSI), Fibre Channel (FC), etc. In other embodiments, the storage nodes 150-1, 150-2, . . . , 150-S can be network-connected to each of the storage control nodes 140-1, 140-2, . . . , 140-C (via a high-performance network fabric) using any suitable network configuration and network interface protocol such as Ethernet, FC, Internet Small Computer Systems Interface (iSCSI), InfiniBand, etc. For example, in some embodiments, the storage control nodes 140 and storage nodes 150 are interconnected in a full-mesh network, wherein back-end interconnectivity between the storage control nodes 140 and the storage nodes 150 is achieved using, e.g., a redundant high-speed storage fabric, wherein the storage control nodes 140 can utilize remote procedure calls (RPC) for control messages and remote direct memory access (RDMA) for moving data blocks.

In some embodiments, the storage data servers 142 of the storage control nodes 140 are configured to consolidate the capacity of the storage device arrays 152 (e.g., HDDs, SSDs, PCIe or NVMe flash cards, etc.) of the storage nodes 150 into storage pools from which logical volumes are allocated, wherein the logical volumes (e.g., a block unit of storage management) are identified by, e.g., logical unit numbers (LUNs). More specifically, the storage data servers 142 of the storage control nodes 140 are configured to create and manage storage pools (e.g., virtual pools of block storage) by aggregating storage capacity of the storage device arrays 152 of the storage nodes 150 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 142. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 142. The SDC provides the operating system or hypervisor (which runs the SDC) access to the logical block devices (e.g., volumes). Each SDC has knowledge of which storage data servers 142 hold (e.g., own) its block data, so multipathing can be accomplished natively through the SDCs.

As noted above, the management nodes 160 in FIG. 1 implement a management layer which manages and configures the network computing environment 100. In some embodiments, the management nodes 160 comprise a tightly-coupled cluster of manager nodes that are configured to supervise the operations of the storage cluster and manage storage cluster configurations. For example, management nodes 160 include metadata manager (MDM) modules that operate outside of the data path and provide the relevant information to the SDCs and the storage data servers 142 to allow such components to control data path operations. The MDM modules are configured to manage the mapping of SDCs to the storage data servers 142 of the storage control nodes 140. The MDM modules manage various types of metadata that are required to perform various management operations in the storage environment such as, e.g., managing configuration changes, managing the SDCs and storage data servers 142, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

The data deduplication control systems 144 of the storage control nodes 140 are configured to perform data deduplication operations to reduce duplicate/redundant data that is stored in the storage nodes 150 of the data storage system 130. As explained in further detail below, the data deduplication control systems 144 implement a data deduplication scheme that is configured to provide efficient deduplication validation and creation in, e.g., a disaggregated storage system in which deduplication is performed cross-node (e.g., two different storage control nodes) and implements a byte-by-byte data compare process for block-level deduplication. Exemplary deduplication schemes according to embodiments of the disclosure will now be discussed in further detail in conjunction with FIGS. 2, 3 and 4.

Figure 2:
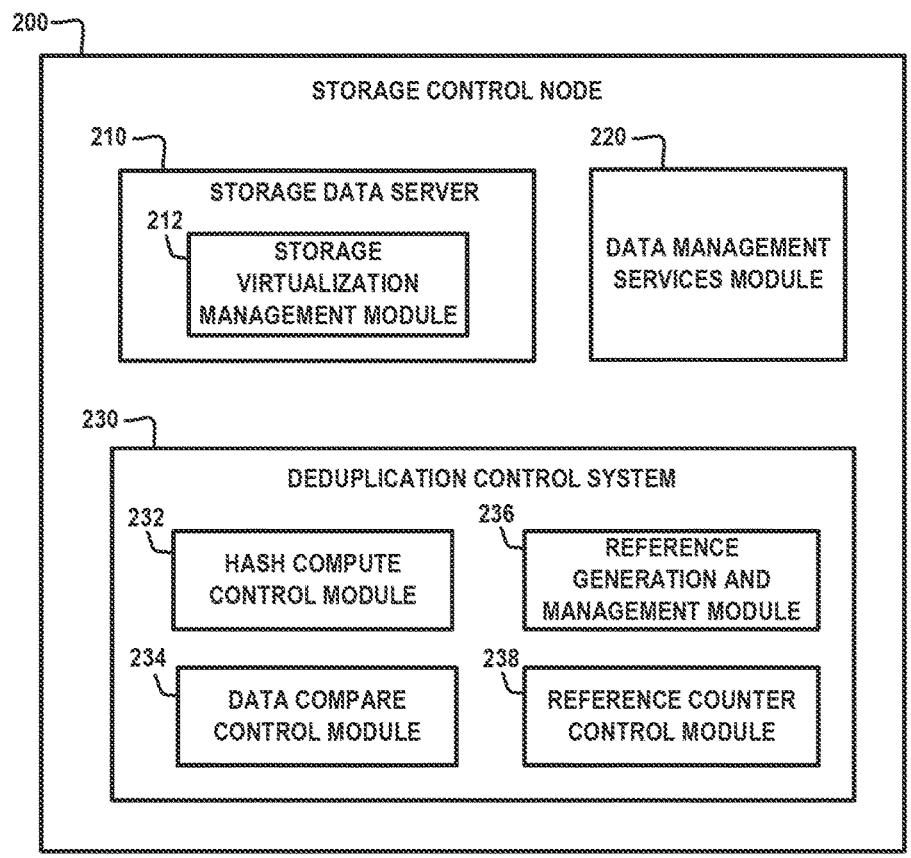
FIG. 2 schematically illustrates a storage control node which implements a data deduplication system, according to an exemplary embodiment of the disclosure.

FIG. 2 schematically illustrates a storage control node 200 which implements a data deduplication system, according to an exemplary embodiment of the disclosure. In some embodiments, FIG. 2 schematically illustrates an exemplary architecture of the storage control nodes 140 of the data storage system 130 of FIG. 1. As shown in FIG. 2, the storage control node 200 comprises a storage control system which implements a storage data server 210, a data management services module 220, and a data deduplication control system 230. The storage data server 210 comprises a storage virtualization management module 212. The data deduplication control system 230 comprises various modules including, but not limited to, a hash compute control module 232, a data compare control module 234, a reference generation and management module 236, and a reference counter control module 238, the functions of which will be explained in further detail below.

The storage data server 210 implements functions as discussed above such as processing I/O write and read requests received from host systems to write/read data to/from target storage nodes 150. The storage virtualization management module 212 implements any suitable logical volume management (LVM) system which is configured to create and manage local storage volumes by aggregating the capacity of the storage nodes 150 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 220 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration.

The data deduplication control system 230 is configured to control deduplication operations that are performed by the storage control node 200. In some embodiments, the data deduplication control system 230 implements a block-level deduplication (or sub-file deduplication) scheme which is configured to compare data blocks (alternatively, data items, data chunks, or shards) to identify and eliminate duplicate data blocks. The block-level deduplication process eliminates duplicate/redundant data blocks that are the same, even when the files which contain the duplicate data blocks are not entirely identical. In some embodiments, a block-level deduplication scheme is implemented by dividing data (e.g., file) into fixed sized data blocks (e.g., 4 KB, 8 KB, etc.) and creating a unique digital signature (e.g., hash value) for each unique data block. For example, assuming that data is divided into 8 KB chunks, a 16 KB file will be divided into two 8 KB data blocks, and an associated unique hash value will be generated for each of the two 8 KB data blocks.

A unique hash value for each unique data block in the data storage system is stored in a global hash database to enable the data deduplication control system 230 to compare hash values that are computed for new incoming data blocks with the unique hash values stored in the global hash database to determine whether a given new data block is unique, or a duplicate or possible duplicate of an existing data block. More specifically, in some embodiments, an entire computed hash value for each unique data block (e.g., long, strong hash value) is stored in the global hash database. In this instance, when the data deduplication control system 230 finds a match between a computed hash value of a new data block with a unique hash value in the global hash database, the data deduplication control system 230 can deem the new data block to be a duplicate (or most likely a duplicate) of an existing data block in the data storage system.

In other embodiments, to conserve system memory, a portion of the computed hash value (e.g., partial hash value) for each unique data block is stored in the global hash database. The partial hash values are sufficient to enable the data deduplication control system 230 to compare a computed hash value of a new data block with the partial hash values in the global hash database to determine whether or not the computed hash value matches a given partial hash value. In this instance, when the data deduplication control system 230 finds a match between a computed hash value of a new data block with a unique partial hash value in the global hash database, the data deduplication control system 230 can deem the new data block to be a potential duplicate of an existing data block in the data storage system, and will utilize the matching partial hash value to determine a location of the existing data block associated with the partial hash value.

When a new data block is deemed to be a duplicate, or a potential duplicate, of an existing data block stored in the data storage system, the data deduplication control system 230 of the storage control node (e.g., a referrer node) will commence a data deduplication control process to verify whether the new data block is in fact a duplicate of the existing data block associated with the matching hash value or partial hash value. Ultimately, if the new data block is determined to be a duplicate of the existing data block, the duplicate data block is replaced with a reference (e.g., pointer) that points to the existing data block. Once the data has been deduplicated, upon read back of a given file containing one more data blocks, whenever a reference (e.g., pointer) is found for the given file, the system will replace the reference with the unique data block associated with the reference.

In some embodiments, the data deduplication control process does not assume that two data blocks with matching hash values (e.g., full or partial hash values) are identical, but rather, two data blocks with matching hash values are deemed to be potential duplicates, and a "referrer-owner" negotiation process is performed to verify whether the two data blocks with the same hash value are identical or similar. More specifically, in some embodiments, a deduplication control scheme implements a "referrer-owner" negotiation process to perform data deduplication operations. The term "owner" or "owner node" as used herein denotes a compute entity (e.g., storage control node) which "owns" a given data item (e.g., a compute entity to which a first copy of the data item was originally written). The term "referrer" or "referrer node" as used herein denotes a compute entity (e.g., storage control node) which is writing (or which has written) a new data block that may or may not be the same or similar to an existing original data block that is owned by the "owner".

The referrer node and the owner node conduct a negotiation process to determine whether a new data block is identical or similar to an existing data block that is owned by the owner node, and to establish a reference between the referrer and the owner when the new data block is determined to be identical or similar. As explained in further detail below, in some embodiments, a "referrer-owner" negotiation process comprises (i) a read validation process and (ii) a deduplication validation process. The read validation process is performed to determine whether an existing data block, which is read from storage to compare with the new data block, actually corresponds to the unique data block associated with the matching hash value. Upon a successful read validation, the deduplication validation process is performed to compare the existing data block (which is read from storage) with the new data block to determine whether or not the new data block is the same or similar to the exiting data block read from storage. Typically, the referrer node and the owner node are two separate storage control nodes that reside on different physical machines, and are network connected. As explained in further detail below, the "referrer-owner" negotiation process is configured to minimize (i) the amount of data transfers that are performed by, and (ii) the number of messages that are exchanged, the owner and referrer nodes during a data deduplication operation.

At any given time, with regard to performing data deduplication, the storage control node 200 of FIG. 2 can be an owner node or a referrer node. The various modules of the data deduplication control system 230 implement functions to enable the storage control node 200 to perform deduplication operations as an owner node or a referrer node. For example, the hash compute control module 232 is configured to implement various methods to support data deduplication operations including, but not limited to, methods for computing hash values for data blocks, and methods for querying a global hash database to compare computed hash values with stored hash values. In some embodiments, the hash compute control module 232 implements any suitable hashing algorithm, such as Secure Hash Algorithm (e.g., SHA-1, SHA-2, SHA-256), which is configured to creates a cryptographic alpha-numeric value (referred to as a hash value) for a given data block. The hash compute control module 232 implements methods to compare a computed hash value of a given data block to stored hash values in the global hash database to determine whether the computed hash value of the given data block is unique or exists in the database. If the computed hash value is unique, the data block can be written to storage and the computed hash value is added to the global hash database. If the computed hash value already exists, a referrer-owner negotiation process is performed to verify whether the given data block is a duplicate block. Ultimately, if the given data block is deemed to be a duplicate, the hash value is discarded.

The data compare control module 234 implements methods that are configured to enable a storage control node (operating as, e.g., a referrer node) to identify duplicate/redundant data blocks. More specifically, in embodiments where the data deduplication control system 230 implements block-level deduplication, the data compare control module 234 is configured to perform a byte-by-byte comparison between two data blocks to determine whether or not the two data blocks are duplicate data blocks.

The reference generation and management module 236 implements methods that are configured to enable a storage control node (operating as, e.g., a referrer node) to generate and manage references to data blocks that are owned by other storage control nodes. For example, for a block-level deduplication scheme, when a match occurs between a given data block and an existing (stored) data block, the given data block is deemed to be a duplicate data bock (or redundant data block), and the duplicate data block is replaced with a reference that points to the stored data block.

The reference counter control module 238 implements methods that are configured to maintain a reference count for each data block owned by the storage control node 200 (operating as, e.g., an owner node). The reference count for a given data block denotes a number of referrer nodes that hold a reference (e.g., pointer) to the given data block owned by the owner node. The reference count for a given data block allows the owner node to decide when it is safe to delete the given data block when the reference count is zero (0). Otherwise, if the reference count for a given data block is greater than zero, the owner node will not delete/release the data block, as the reference count greater than zero indicates that at least one other storage control node (referrer node) requires access to the data block.

Figure 3:
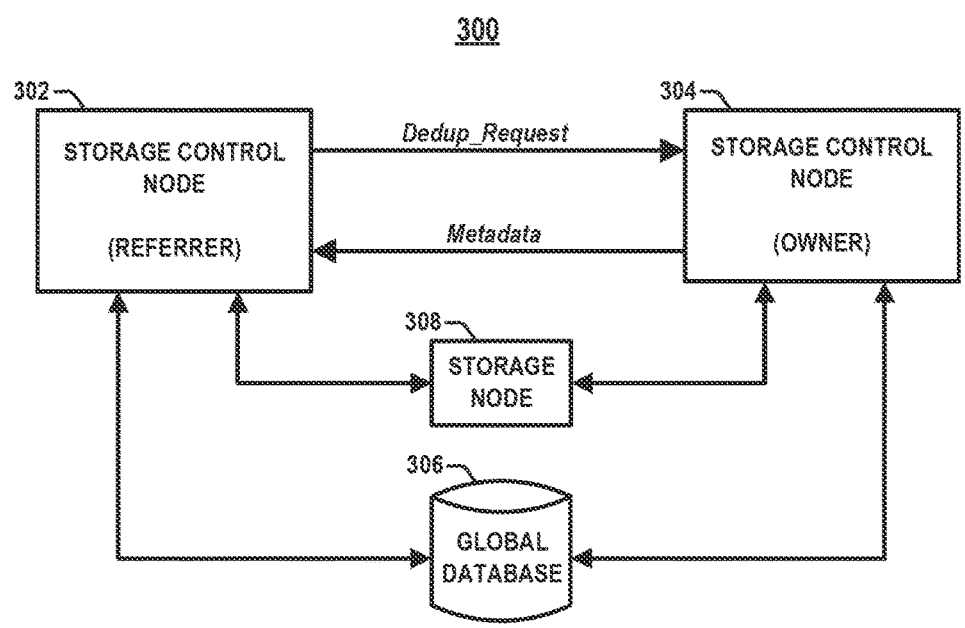
FIG. 3 schematically illustrates a method for performing data deduplication, according to an exemplary embodiment of the disclosure.

FIG. 3 schematically illustrates a method for performing data deduplication, according to an exemplary embodiment of the disclosure. More specifically, FIG. 3 schematically illustrates a "referrer-owner" negotiation process 300 which is performed between a first storage control node 302 (operating as a referrer node), and a second storage control node 304 (operating as an owner node). For illustrative purposes, the exemplary process 300 of FIG. 3 assumes that the first and second storage control nodes 302 and 304 are hosted on different physical nodes of a data storage system and communicate over a network, and the data storage system comprises a disaggregated architecture which allows the first and second storage control nodes 302 and 304 to read data from any storage node in the data storage system, irrespective of whether the storage node is local or remote to the storage control node.

As further shown in FIG. 3, the data deduplication process involves the first storage control node 302 accessing a global hash database 306 and a storage node 308, and exchanging messages (e.g., Dedup_Request, Metadata) between the first and second storage control nodes 302 and 304 during the "referrer-owner" negotiation process 300. The process 300 assumes that the first storage control node 302 has received a given data block, computed a hash value for the given data block, searched the global database 306 for a matching hash value, and has determined that the computed hash value for the given data block matches a stored hash value (for an existing data block) in the global database 306.

In this instance, the first storage control node 302 (operating as a referrer node with respect to the given data block) initiates the "referrer-owner" negotiation process 300 by sending the Dedup_Request message to the second storage control node 304 (operating as an owner node with respect to the existing data block). In response to the Dedup_Request message, the second storage control node 304 increments a reference counter for the given data block, and returns a Metadata message to the first storage control node 302, wherein the Metadata message comprises metadata which is needed to read the given data block from a storage node. The first storage control node 302 uses the received metadata to read the existing data block from the target storage node (e.g., storage node 308). The first storage control node 302 performs a validation process by comparing the read data block with the given data block (e.g., byte-by-byte compare) to determine whether or not the given data block is a duplicate of the existing data block. If the validation process is successful (i.e., the data compare process determines that the given data block is a duplicate of the existing data block), the first storage control node 302 will create a reference to the existing data block, rather than store the given data block.

The exemplary process flow of FIG. 3 assumes that the "referrer-owner" negotiation process 300 results in a successful validation process (e.g., data compare process). Since the deduplication process begins with a hash database lookup operation which provides an indication that the given data block is a duplicate of an existing data block, and provides the location of the existing data block, there is a likelihood that the validation process (e.g., data compare process) will be successful. In this regard, the "referrer-owner" negotiation process 300 involves a minimal amount of messaging over a network communication link between the first and second storage control nodes 302 and 304. In particular, as shown in FIG. 3, a successful validation process involves only one request/response message exchange (e.g., Dedup_Request/Metadata messages) between the first and second storage control nodes 302 and 304.

Moreover, in a disaggregated storage system, "referrer-owner" negotiation process 300 can be implemented by performing no more than a single data transfer over a network as needed for the first storage control node 302 to read the target data block from the storage node 308 (assuming the storage node 308 is a remote node, and not local to the first storage control node 302). In this regard, the exemplary deduplication negotiation process of FIG. 3 provides an efficient deduplication solution which minimizes the amount of data transfers and metadata messages that are exchanged for a successful validation process. There are additional steps and messages that may be exchanged between the owner and referrer nodes as part of a "referrer-owner" negotiation process when, for example, the validation process (e.g., data compare process) is not successful, or if some other error occurs, details of which will be explained below in conjunction with FIG. 4. However, an unsuccessful validation process or the occurrence of other errors during the deduplication process are unlikely and, as such, do not impact system performance.

Figure 4:
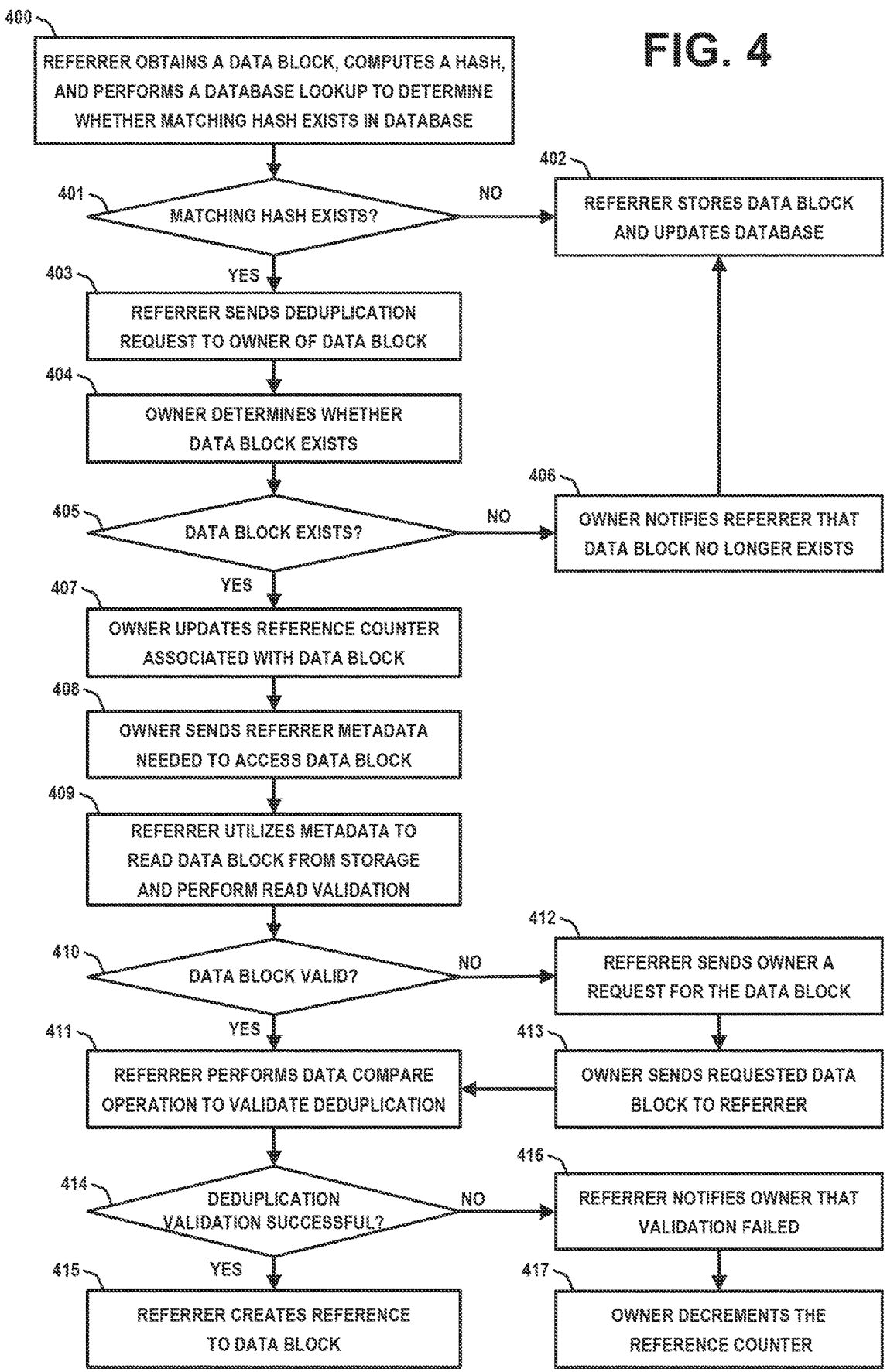
FIG. 4 illustrates a flow diagram of a method for performing data deduplication, according to an exemplary embodiment of the disclosure.

FIG. 4 illustrates a flow diagram of a method for performing data deduplication, according to an exemplary embodiment of the disclosure. For illustrative purposes, the deduplication process of FIG. 4 will be discussed in the context of the referrer and owner nodes 302 and 304 as shown in FIG. 3, wherein it is assumed that the referrer and owner nodes 302 and 304 implement the exemplary data deduplication control system 230 of FIG. 2. As is known in the art, a deduplication process can be implemented "in-line" as data is received by a storage control node, or "post-process" after the storage control node has written the data to a storage node. With post-process deduplication, newly received data is first stored in a storage device of a storage node, and a deduplication process is implemented at a later time to analyze and deduplicate the stored data. On the other hand, with in-line data deduplication, hash computations are performed in-line as data is received. If the storage control node identifies that a given data block has already been stored, only a reference to the existing data block will be stored, rather than the received data block itself For illustrative purposes, FIG. 4 will be described in the context of an in-line deduplication process wherein it is assumed that the first storage control node 302 (referrer node) receives a data file as part of an I/O write request. The data deduplication control system 230 of the referrer node will divide the data file into a plurality of data blocks having a predetermined block size (e.g., 8 KB). By way of example, a 128 KB file can be divided into sixteen (16) data blocks, wherein each data block has a block size of 8 KB. For a given new data block, the referrer node will compute a hash value (via the hash compute control module 232), and perform a database lookup operation to determine whether a matching hash value exists in the global hash database 306 (block 400). The database lookup operation is performed to compare the computed hash value of the given data block to the hash values of existing data blocks which are stored in the global hash database. The database lookup operation allows the referrer node to determine if the given data block is unique or a possible duplicate.

It is to be understood that even if the database lookup operation returns a match, it does not necessarily mean that an exact duplicate of the given data block actually exists in the data storage system. Indeed, for various reasons, a matching hash value may only provide an indication of high likelihood that an exact duplicate of the given data block exists, but the matching hash value is not definitive. For example, the hash database may not be completely accurate for various reasons. In some embodiments, as noted above, to conserve system memory, the global hash database may be configured to store partial hash values for existing data blocks, wherein the partial hash value for an existing data block is sufficient to provide an indication of a location of the existing data block, but not sufficient to enable a hash comparison to definitively determine that two data blocks are identical. Furthermore, at any given time, the global hash database may have some stale data in instances where "transactional updates" are not made to the global hash database when existing data blocks of the data storage system are deleted or modified. For example, existing data blocks may have been recently deleted by respective owner nodes, without updating the global hash database to remove the hash values associated with the deleted data blocks. Further, existing data blocks may have been recently modified by respective owner nodes, without updating the global hash database to update the hash values associated with the modified data blocks. In this instance, if a database lookup operation is performed before the global hash database is updated, the database will have stale data due to the existence of hash values associated with deleted or old data blocks.

When the result of the database lookup operation indicates that no matching hash value exists (negative result in block 401), it can be assumed that the given data block is unique. In this instance, the referrer node can proceed to store the given data block in a target storage node (where the referrer node essentially becomes an owner node of the given data block), and update the global hash database to include the computed hash value (or a partial hash value) of the given data block (block 402). On the other hand, when the result of the database lookup operation indicates that a matching hash value exists (affirmative result in block 401), it can be assumed that the given data block is a possible duplicate. In this instance, the referrer node sends a deduplication request (e.g., Dedup_Request message, FIG. 3) to the owner node to initiate a "referrer-owner" negotiation process (block 403). The deduplication request will include metadata which identifies the location of the data block associated with the matching hash value.

In response to receiving the deduplication request, the owner node will utilize the metadata to confirm that the data block exists (block 404). For example, there may be a circumstance in which the owner node deleted the data block prior to receiving the deduplication request. If the owner node determines that the data block does not exist (negative determination in block 405), the owner node will notify the referrer node that the data block does not exist (block 406), in which case the referrer node can proceed to store the given data block in a target storage node, and then update the global hash database to include the computed hash value (or a partial hash value) of the given data block (block 402). On the other hand, if the owner node determines that the data block does exist (affirmative determination in block 405), the owner node will proceed to update (e.g., increment) the reference counter associated with the existing data block owed by the owner node (block 407), and the owner node sends a response message to the referrer node which includes a confirmation/approval to proceed with deduplication validation and creation, along with metadata (e.g., pointer) that enables the referrer node to access the existing data block from a target storage node (block 408).

In response to receiving the metadata message from the owner node, the referrer node will utilize the received metadata to read the existing data block from the target storage node and perform a read validation process (block 409). In some embodiments, a read validation process is performed by comparing the received metadata with metadata contained in a header of the read data block to ensure that the content of the read data block corresponds to the content of the data block that was pointed to by the owner node. In some embodiments, a read validation process comprises the referrer node comparing a metadata identifier (ID) of the received metadata with an embedded metadata ID of the read data block to determine whether the metadata IDs match. This read validation eliminates the need for the owner node to place a "read lock" on the data block to ensure that the data block is not moved or otherwise modified before the data block is read by the referrer node. It is to be noted that in some embodiments, the owner node may place a read lock on the data block for the referrer node to read the data. However, the read locking operation has performance costs and generates dependencies, e.g., read locking would require additional messages to be exchanged between the owner and referred nodes to lock and unlock of the data block for read access by the referrer node. On the other hand, when no read lock is placed on the data block, the data read by the referrer node can be deemed opportunistic such that if the stored data block contains metadata that can be used to validate that the content of the data block is the content that the referrer node expects to read, the referrer node can perform the read without read locking.

If the read validation process is successful where the content of the read data block is deemed valid (affirmative determination in block 410), the referrer node will perform a deduplication validation process by comparing the existing data block (read from storage) with the given data block (e.g., byte-by-byte compare) to determine whether or not the given data block is a duplicate of the existing data block (block 411). On the other hand, if the read validation process is not successful where the content of the read data block is deemed to be invalid (negative determination in block 410), in some embodiments, the referrer node will send the owner node a request for the data block (block 412). The owner node will read the target data block from storage, and send the read data block to the referrer node (block 413), in which case the referrer node performs a deduplication validation process (block 411) using the data block received from owner node. In other embodiments, if the read validation process is not successful where the content of the read data block is deemed to be invalid (negative determination in block 410), the deduplication operation for the given data block can be skipped, whereby the referrer node stores the given data block in a target storage node.

If the deduplication validation operation is successful, i.e., the data compare process determines that the given data block is a duplicate of the existing data block read from memory (affirmative determination in block 414), the referrer node will create reference to the existing data block, and discard/delete the given data block (block 415). In this instance, the deduplication operation for the given data block is deemed complete, without the need for the referrer node to send a notification message to the owner node to notify the owner node of the successful deduplication operation. Since the owner node has already incremented the reference counter for the given data block prior to the deduplication validation operation, in the absence of receiving a deduplication validation failure notification, the owner node can assume that the deduplication operation was successful, and maintain the reference counter at the incremented count value.

On the other hand, if the deduplication validation operation is not successful, i.e., the data compare process determines that the given data block is not a duplicate of the existing data block read from memory (negative determination in block 414), the referrer node will store the given data block in a target storage node (and assume ownership of the given data block), and the referrer node will send a deduplication validation failure notification to the owner node (block 416). In response to such failure notification, the owner node will decrement the reference counter for the existing data block read from storage (block 417). The process flow of FIG. 4 is performed for each data block of the given data file.

It is to be appreciated that the exemplary embodiments of FIGS. 3 and 4 illustrate an efficient solution for implementing a data deduplication process which minimizes the amount of data transfers and metadata messages that are exchanged over a network communication link between the referrer node and owner node for a successful data deduplication processing path (e.g., process path 403→404→405→407→408→409→410→411→414→415, FIG. 4). As noted above, a successful validation process involves one request/response message exchange (e.g., blocks 402 and 408) between the referrer and owner nodes, and one data transfer (e.g., block 409) for the referrer node to read an existing data block from storage.

It is to be appreciated that the exemplary deduplication techniques as discussed herein provide improvements and advantages over conventional schemes. For example, as noted above, the implementation of a disaggregated storage system architecture allows any storage control node to read data from any storage node. In this regard, the implementation of the disaggregated architecture enables the referrer node to directly read the original data from any storage node using metadata received from the owner node. As compared to conventional deduplication systems that are implemented in storage system architectures in which each owner node controls access to its data, to implement a byte-by-byte data compare process (deduplication validation), the owner node that owns a given original data block would have to read the original data block from storage (requiring one data transfer over the network) and then either (i) the owner node would send the original data block to the referrer node to perform deduplication validation or (ii) the referrer node would send the new data block to the owner node to perform the deduplication validation (requiring a second data transfer over the network). In this instance, cross-node deduplication would require at least two network hops for transferring data, which is costly in terms of latency and resource utilization. Additionally, the data transfer process can require the exchange of additional metadata messages. In contrast to conventional schemes, the exemplary embodiments as described herein enable cross-node deduplication a disaggregated storage system in which only a single network hop is needed for the referrer node to read data directly from a storage node.

Furthermore, as noted above, the exemplary deduplication techniques as discussed herein eliminate the need for an owner node to place a "read lock" on the original data block that is to be read by the referrer node, which avoids the performance costs associated with implementing the "read lock" process. Instead, as noted above, the read operation by the referrer node is opportunistic, wherein the referrer node utilizes the metadata received from the owner node to perform a read validation process (e.g., blocks 409 and 410, FIG. 4) to validate that the original data block read from storage is actually the data block the referrer node expects to read (e.g., the data block has not been moved or updated, etc.). Only in the exceptional and unlikely case that the read verification fails, the referrer node can request the owner node to actually read and send the original data block to the referrer node.

In addition, the exemplary deduplication techniques as discussed herein provide for relaxed reference counting, wherein the owner node increments the reference counter for the original data block (e.g., block 407, FIG. 4) before the referrer node performs deduplication validation to validate a match between the original data block and the new data block (e.g., blocks 411 and 414, FIG. 4). This is possible because the deduplication process begins with an indication from the lookup hash database that there is a likely match in this location. This assumption allows the deduplication negotiation process between the referrer and owner nodes to begin and operate in a non-transactional manner, wherein the reference counter for the original data block can be incremented by the owner node knowing that the deduplication process will mostly likely succeed.

With the relaxed reference counting, due to unlikely errors, the reference counter for a given data block may be higher than it should be. For example, there can be situation where the reference counter for a given original data block is incremented by an owner node, but the deduplication validation fails and the owner node does not receive the failure notification from the referrer node (e.g., block 416, FIG. 4) due to some system error. In this instance, the owner node will assume the deduplication validation was successful (in the absence of receiving the failure notification) and thus does not decrement the reference counter. In other words, while it is advantageous for the reference creation and reference counter update to be non-transactional (which minimizes number of messages to be exchanged between the referrer and owner nodes), there is some small chance for the system to fail after the reference counter was incremented but before the reference was created, without requiring rolling back the increment. However, the only disadvantage of having a higher than necessary reference counter is that the owner cannot delete/release a given data block unless the associated reference counter is zero (0). This can be solved by a background process that occasionally repairs faulty counters. On the other hand, it is to be noted that the non-transactional nature of the deduplication negotiation process will not result in a lower than necessary reference counter, which can lead to data loss in circumstances where the reference counter for a given data block is zero (0) but there are actually one or more referrer nodes that hold a reference to the given data block.

While the exemplary embodiments are described herein the context of performing byte-by-byte data compare operations for deduplication validation, it is to be appreciated that the exemplary deduplication techniques can be implemented for similarity-based deduplication. A similarity-based deduplication process creates a reference to existing original data which is deemed to be similar but not identical to the new data, and also stores the changes between the original and the new data. The changes are stored on the referrer's side and therefore performing the data compare validation process at the referrer's side, as in deduplication schemes discussed above, is imperative.

Figure 5:
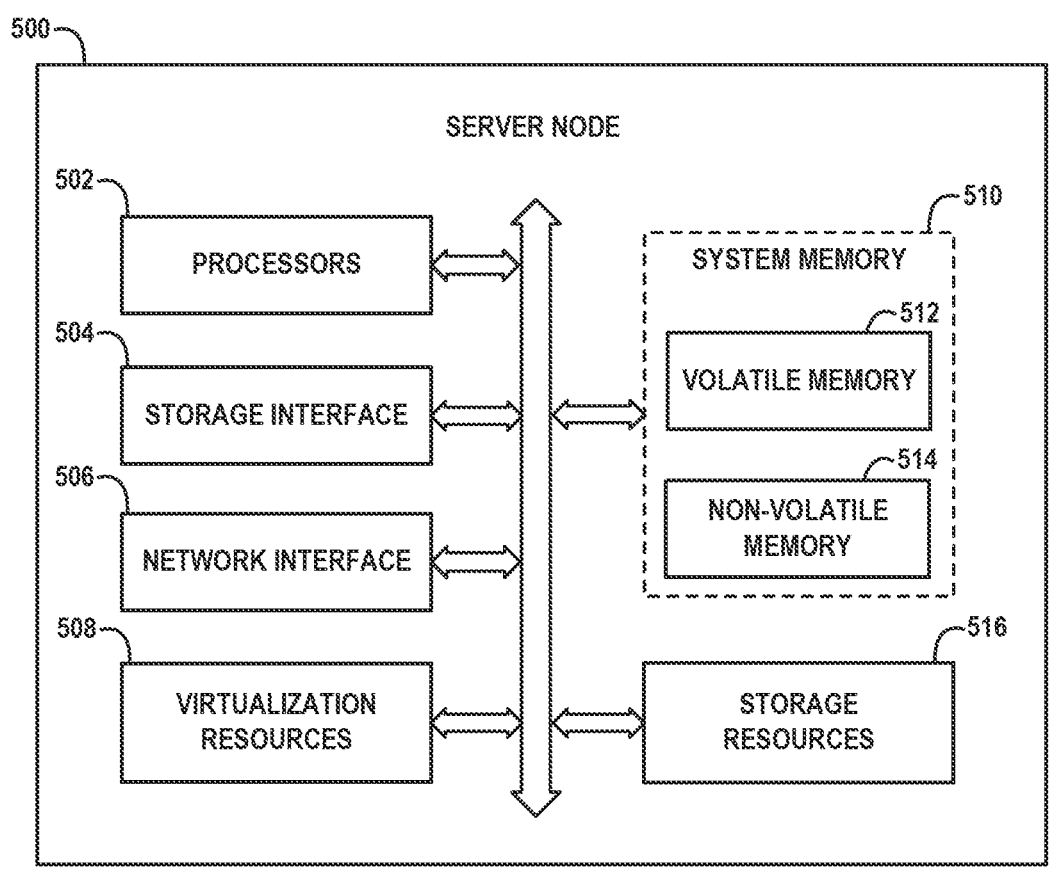
FIG. 5 schematically illustrates a framework of a server for hosting a storage control node, according to an exemplary embodiment of the disclosure.

FIG. 5 schematically illustrates a framework of a server node 500 for hosting a storage control node, according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the server node 500. For example, the virtualization resources 508 can be configured to implement the various modules and functionalities of a host connectivity management system as discussed herein. In some embodiments, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities of a storage control node and a data deduplication control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage control nodes and data deduplication control systems (as shown in FIGS. 1 and 2) and the deduplication processes discussed herein (e.g., FIGS. 3 and 4) are implemented using program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile system memory 512 is configured as the highest-level memory tier, and the non-volatile system memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
performing a data deduplication process in a data storage system, the data storage system comprising storage nodes, and storage control nodes comprising at least a first storage control node and a second storage control node, wherein each of the storage control nodes can access data directly from each of the storage nodes, wherein the data deduplication process comprises:
determining, by the first storage control node, whether a given data block is at least a potential duplicate of an original data block that is managed by another storage control node of the data storage system; and
in response to the first storage control node determining that the given data block is a potential duplicate of an original data block that is managed by the second storage control node:
sending, by the first storage control node, a first message to the second storage control node, wherein the first message comprises a request to initiate a deduplication process for determining whether the given data block is an actual duplicate of the original data block managed by the second storage control node;
incrementing, by the second storage control node, a reference counter associated with the original data block managed by the second storage control node, wherein the reference counter maintains a count indicative of a number of other storage control nodes that hold a reference to the original data block managed by the second storage control node, wherein the second storage control node increments the reference counter prior to determining whether or not the given data block is an actual duplicate of the original data block;
sending, by the second storage control node, a second message to the first storage control node, wherein the second message comprises metadata which comprises information to enable the first storage control node to read the original data block from a given storage node;
reading, by the first storage control node, the original data block from the given storage node based on the metadata of the second message;

performing, by the first storage control node, a data compare process to determine whether the given data block is an actual duplicate of the original data block;

creating, by the first storage control node, a reference to the original data block, in response to determining that the given data block is an actual duplicate of the original data block;

in response to receiving, by the second storage control node, a notification message from the first storage control node that the given data block is not an actual duplicate of the original data block, the second storage control node decrementing the count of the reference counter associated with the original data block; and in an absence of receiving, by the second storage control node, a notification message from the first storage control node that the given data block is not an actual duplicate of the original data block, the second storage control node maintaining the count of the reference counter associated with the original data block.

2. The method of claim 1, wherein determining, by the first storage control node, whether the given data block is at least a potential duplicate of an original data block that is managed by another storage control node of the data storage system, comprises:

computing, by the first storage control node, a hash value of the given data block;

performing, by the first storage control node, a lookup operation on a hash database to determine whether the hash database comprises a stored hash value which matches the computed hash value of the given data block; and in response to the lookup operation finding a stored hash value which matches the computed hash value, the first storage control node:

determining that the given data block is at least potential duplicate of the original data block associated with the matching hash value; and determining a location of the original data block based on the matching hash value;

wherein metadata of the first message, which is sent to the second storage control node, comprises the location of the original data block.

3. The method of claim 1, wherein the data deduplication process further comprises:

in response to receiving the first message from the first storage control node, the second storage control node utilizing the metadata of the first message to determine whether the original data block exists;

wherein the second storage control node increments the reference counter associated with the original data block if the original data block is determined to exist.

4. The method of claim 1, wherein prior to the first storage control node performing the data compare process, the data deduplication process further comprising:

performing, by the first storage control node, a read validation process by comparing the metadata of the second message to metadata contained in a header of the original data block read from the given storage node to determine whether the original data block read from the given storage node corresponds to the original data block identified by the metadata of the second message;

wherein the first storage control node performs the data compare process if the read validation process determines that the original data block read from the given storage node does correspond to the original data block identified by the metadata of the second message.

5. The method of claim 4, wherein the data deduplication process further comprises:

in response to the read validation process determining that the original data block read from the given storage node does not correspond to the original data block identified by the metadata of the second message:

sending, by the first storage control node, a third message to the second storage control node, wherein the third message comprises a request for the second storage control node to provide the original data block to the first storage control node; and in response to the third message, the second storage control node obtaining and sending the original data block to the first storage control node.

6. The method of claim 1, wherein the data compare process performed by the first storage control node comprise a byte-by-byte comparison between the given data block and the original data block to determine whether the given data block is identical to the original data block.

7. The method of claim 1, wherein the data deduplication process further comprises:

in response to the first storage control node determining, as a result of the data compare process, that the given data block is not an actual duplicate of the original data block, sending, by the first storage control node, the notification message to the second storage control node, that the given data block is not an actual duplicate of the original data block.

8. The method of claim 1, wherein the data deduplication process comprises an in-line deduplication process in which the given data block is a portion of a file that is received by the first storage control node as part of an input/output write request.

9. An article of manufacture comprising a non-transitory processor-readable storage medium having stored therein program code of one or more software programs, wherein the program code is executable by one or more processors to implement a method which comprises:

performing a data deduplication process in a data storage system, the data storage system comprising storage nodes, and storage control nodes comprising at least a first storage control node and a second storage control node, wherein each of the storage control nodes can access data directly from each of the storage nodes, wherein the data deduplication process comprises:

determining, by the first storage control node, whether a given data block is at least a potential duplicate of an original data block that is managed by another storage control node of the data storage system; and in response to the first storage control node determining that the given data block is a potential duplicate of an original data block that is managed by the second storage control node:

sending, by the first storage control node, a first message to the second storage control node, wherein the first message comprises a request to initiate a deduplication process for determining whether the given data block is an actual duplicate of the original data block managed by the second storage control node;

incrementing, by the second storage control node, a reference counter associated with the original data block managed by the second storage control node, wherein the reference counter maintains a count indicative of a number of other storage control nodes that hold a reference to the original data block managed by the second storage control node, wherein the second storage control node increments the reference counter prior to determining whether or not the given data block is an actual duplicate of the original data block;

sending, by the second storage control node, a second message to the first storage control node, wherein the second message comprises metadata which comprises information to enable the first storage control node to read the original data block from a given storage node;

reading, by the first storage control node, the original data block from the given storage node based on the metadata of the second message;

performing, by the first storage control node, a data compare process to determine whether the given data block is an actual duplicate of the original data block;

creating, by the first storage control node, a reference to the original data block, in response to determining that the given data block is an actual duplicate of the original data block;

in response to receiving, by the second storage control node, a notification message from the first storage control node that the given data block is not an actual duplicate of the original data block, the second storage control node decrementing the count of the reference counter associated with the original data block; and in an absence of receiving, by the second storage control node, a notification message from the first storage control node that the given data block is not an actual duplicate of the original data block, the second storage control node maintaining the count of the reference counter associated with the original data block.

10. The article of manufacture of claim 9, wherein the program code for determining, by the first storage control node, whether the given data block is at least a potential duplicate of an original data block that is managed by another storage control node of the data storage system, comprises program code for:

computing, by the first storage control node, a hash value of the given data block;

performing, by the first storage control node, a lookup operation on a hash database to determine whether the hash database comprises a stored hash value which matches the computed hash value of the given data block; and in response to the lookup operation finding a stored hash value which matches the computed hash value, the first storage control node:

determining that the given data block is at least a potential duplicate of the original data block associated with the matching hash value; and determining a location of the original data block based on the matching hash value;

wherein the metadata of the first message, which is sent to the second storage control node, comprises the location of the original data block.

11. The article of manufacture of claim 9, wherein the program code for performing the data deduplication process further comprises program code for:

in response to receiving the first message from the first storage control node, the second storage control node utilizing the metadata of the first message to determine whether the original data block exists;

wherein the second storage control node increments the reference counter associated with the original data block if the original data block is determined to exist.

12. The article of manufacture of claim 9, wherein the program code for performing the data deduplication process further comprises program code for:

prior to the first storage control node performing the data compare process:

performing, by the first storage control node, a read validation process by comparing the metadata of the second message to metadata contained in a header of the original data block read from the given storage node to determine whether the original data block read from the given storage node corresponds to the original data block identified by the metadata of the second message;

wherein the first storage control node performs the data compare process if the read validation process determines that the original data block read from the given storage node does correspond to the original data block identified by the metadata of the second message.

13. The article of manufacture of claim 12, wherein the program code for performing the data deduplication process further comprises program code for:

in response to the read validation process determining that the original data block read from the given storage node does not correspond to the original data block identified by the metadata of the second message:

sending, by the first storage control node, a third message to the second storage control node, wherein the third message comprises a request for the second storage control node to provide the original data block to the first storage control node; and in response to the third message, the second storage control node obtaining and sending the original data block to the first storage control node.

14. The article of manufacture of claim 9, wherein data compare process performed by the first storage control node comprise a byte-by-byte comparison between the given data block and the original data block to determine whether the given data block is identical to the original data block.

15. The article of manufacture of claim 9, wherein the program code for performing the data deduplication process further comprises program code for:

in response to the first storage control node determining, as a result of the data compare process, that the given data block is not an actual duplicate of the original data block, sending, by the first storage control node, the notification message to the second storage control node that the given data block is not an actual duplicate of the original data block.

16. A system, comprising:

a data storage system comprising storage nodes which comprise respective physical storage devices for storing data, and storage control nodes comprising at least a first storage control node operating on at least a first physical machine and a second storage control node operating on at least a second physical machine, wherein each of the storage control nodes can access data directly from each of the storage nodes; and a data deduplication system implemented by the data storage system, wherein the data deduplication system is configured to perform a data deduplication process which comprises:

determining, by the first storage control node, whether a given data block is at least a potential duplicate of an original data block that is managed by another storage control node of the data storage system; and in response to the first storage control node determining that the given data block is a potential duplicate of an original data block that is managed by the second storage control node:

sending, by the first storage control node, a first message to the second storage control node, wherein the first message comprises a request to initiate a deduplication process for determining whether the given data block is an actual duplicate of the original data block managed by the second storage control node;

incrementing, by the second storage control node, a reference counter associated with the original data block managed by the second storage control node, wherein the reference counter maintains a count indicative of a number of other storage control nodes that hold a reference to the original data block managed by the second storage control node, wherein the second storage control node increments the reference counter prior to determining whether or not the given data block is an actual duplicate of the original data block;

sending, by the second storage control node, a second message to the first storage control node, wherein the second message comprises metadata which comprises information to enable the first storage control node to read the original data block from a given storage node;

reading, by the first storage control node, the original data block from the given storage node based on the metadata of the second message;

performing, by the first storage control node, a data compare process to determine whether the given data block is an actual duplicate of the original data block;

creating, by the first storage control node, a reference to the original data block, in response to determining that the given data block is an actual duplicate of the original data block;

in response to receiving, by the second storage control node, a notification message from the first storage control node that the given data block is not an actual duplicate of the original data block, the second storage control node decrementing the count of the reference counter associated with the original data block; and in an absence of receiving, by the second storage control node, a notification message from the first storage control node that the given data block is not an actual duplicate of the original data block, the second storage control node maintaining the count of the reference counter associated with the original data block.

17. The system of claim 16, wherein the data deduplication system is configured to perform a data deduplication process which further comprises:

prior to the first storage control node performing the data compare process:

performing, by the first storage control node, a read validation process by comparing the metadata of the second message to metadata contained in a header of the original data block read from the given storage node to determine whether the original data block read from the given storage node corresponds to the original data block identified by the metadata of the second message;

wherein the first storage control node performs the data compare process if the read validation process determines that the original data block read from the given storage node does correspond to the original data block identified by the metadata of the second message.

18. The system of claim 17, wherein the data deduplication system is configured to perform a data deduplication process which further comprises:

in response to the read validation process determining that the original data block read from the given storage node does not correspond to the original data block identified by the metadata of the second message:

sending, by the first storage control node, a third message to the second storage control node, wherein the third message comprises a request for the second storage control node to provide the original data block to the first storage control node; and in response to the third message, the second storage control node obtaining and sending the original data block to the first storage control node.

19. The system of claim 16, wherein the data compare process performed by the first storage control node comprise a byte-by-byte comparison between the given data block and the original data block to determine whether the given data block is identical to the original data block.

20. The system of claim 16, wherein the data deduplication system is configured to perform a data deduplication process which further comprises:

in response to the first storage control node determining, as a result of the data compare process, that the given data block is not an actual duplicate of the original data block, sending, by the first storage control node, the notification message to the second storage control node that the given data block is not an actual duplicate of the original data block.

* * * * *